United States Patent
Teng

(10) Patent No.: US 9,419,890 B2
(45) Date of Patent: Aug. 16, 2016

(54) STREAMING SERVICE LOAD SHARING METHOD, STREAMING SERVICE PROCESSING METHOD, AND CORRESPONDING DEVICE AND SYSTEM

(71) Applicant: Huawei Technologies Co., Ltd., Shenzhen, Guangdong (CN)

(72) Inventor: Xindong Teng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 437 days.

(21) Appl. No.: 13/739,746

(22) Filed: Jan. 11, 2013

(65) Prior Publication Data
US 2013/0128722 A1 May 23, 2013

Related U.S. Application Data

(63) Continuation of application No. PCT/CN2011/073722, filed on May 6, 2011.

(30) Foreign Application Priority Data

Jul. 16, 2010 (CN) .......................... 2010 1 0233030

(51) Int. Cl.
*H04L 12/26* (2006.01)
*H04L 12/703* (2013.01)
(Continued)

(52) U.S. Cl.
CPC ............ *H04L 45/28* (2013.01); *H04L 41/0663* (2013.01); *H04L 41/0668* (2013.01); *H04L 61/35* (2013.01); *H04L 65/4069* (2013.01); *H04L 65/80* (2013.01); *H04L 67/1002* (2013.01); *H04L 67/1023* (2013.01); *H04L 67/1029* (2013.01); *H04L 67/1034* (2013.01); *H04L 69/40* (2013.01); *H04N 21/23103* (2013.01)

(58) Field of Classification Search
USPC .................................. 370/218, 219, 220, 242
See application file for complete search history.

(56) References Cited

U.S. PATENT DOCUMENTS

| 6,195,680 | B1 | 2/2001 | Goldszmidt et al. |
| 6,564,336 | B1 * | 5/2003 | Majkowski .................... 714/4.1 |

(Continued)

FOREIGN PATENT DOCUMENTS

| CN | 1512729 A | 7/2004 |
| CN | 1859286 A | 11/2006 |

(Continued)

OTHER PUBLICATIONS

International Search Report dated Aug. 11, 2011 in connection with International Patent Application No. PCT/CN2011/073722.

(Continued)

*Primary Examiner* — Zewdu A Beyen

(57) ABSTRACT

Embodiments of the present invention disclose a streaming service load sharing method, a streaming service processing method, and a corresponding device and system. According to the embodiments of the present invention, a fixed allocation range is determined for each service node, so that when a service node fails and needs to perform smoothing of stream table items, only a fixed allocation range of the failed service node needs to be shared by other service nodes, thereby better ensuring stability of a processing range of the service node, and reducing the number of the stream table items to be smoothed.

7 Claims, 4 Drawing Sheets

(51) Int. Cl.
*H04N 21/231* (2011.01)
*H04L 12/24* (2006.01)
*H04L 29/12* (2006.01)
*H04L 29/08* (2006.01)
*H04L 29/14* (2006.01)
*H04L 29/06* (2006.01)

(56) References Cited

U.S. PATENT DOCUMENTS

| | | | |
|---|---|---|---|
| 7,397,762 B1 | 7/2008 | Firoiu et al. | |
| 7,657,781 B1 | 2/2010 | Dixon et al. | |
| 7,827,146 B1* | 11/2010 | De Landstheer | G06F 11/1451 707/651 |
| 7,881,208 B1* | 2/2011 | Nosella et al. | 370/242 |
| 2003/0053465 A1 | 3/2003 | Sivalingham et al. | |
| 2004/0264481 A1 | 12/2004 | Darling et al. | |
| 2006/0059389 A1* | 3/2006 | Hatamori | G06F 11/2017 714/32 |
| 2006/0233106 A1 | 10/2006 | Achlioptas et al. | |
| 2007/0140112 A1* | 6/2007 | Osterhout | H04L 67/14 370/225 |
| 2008/0276119 A1* | 11/2008 | Barsness et al. | 714/4 |
| 2009/0201935 A1 | 8/2009 | Hass et al. | |

FOREIGN PATENT DOCUMENTS

| | | |
|---|---|---|
| CN | 101022661 A | 8/2007 |
| CN | 101176073 A | 5/2008 |
| CN | 101577705 A | 11/2009 |
| CN | 101651680 A | 2/2010 |
| CN | 101697528 A | 4/2010 |
| CN | 101895472 A | 11/2010 |
| WO | WO 03/026234 A1 | 3/2003 |
| WO | WO 2006/107883 A2 | 10/2006 |

OTHER PUBLICATIONS

Written Opinion of the International Searching Authority dated Aug. 11, 2011 in connection with International Patent Application No. PCT/CN2011/073722.
Partial translation of Office Action dated Aug. 3, 2011 in connection with Chinese Patent Application No. 201010233030.9.
Partial translation of Office Action dated Jun. 14, 2012 in connection with Chinese Patent Application No. 201010233030.9.
Partial translation of Rejection Decision dated Dec. 4, 2012 in connection with Chinese Patent Application No. 201010233030.9.
Supplementary European Search Report dated Jul. 18, 2013 in connection with European Patent Application No. EP 11 80 6236.

* cited by examiner

STREAMING SERVICE LOAD SHARING METHOD, STREAMING SERVICE PROCESSING METHOD, AND CORRESPONDING DEVICE AND SYSTEM

CROSS-REFERENCE TO RELATED APPLICATIONS

This application is a continuation of International Application No. PCT/CN2011/073722, filed on May 6, 2011, which claims priority to Chinese Patent Application No. 201010233030.9, filed on Jul. 16, 2010, both of which are hereby incorporated by reference in their entireties.

TECHNICAL FIELD

The present invention relates to the field of communications technologies, and in particular, to a streaming service load sharing method, a streaming service processing method, and a corresponding device and system.

BACKGROUND

With increasing network traffic, for convenience of network traffic planning, real-time monitoring of a network state, refined charging and traffic control based on application types, and identification and management of some special traffic (for example, malicious traffic identification) to ensure normal use of a network, a current operator or service provider may implement control and management of a streaming service based on the 5-tuple of a packet (a source IP+a source port+a destination IP+a destination port+a protocol number), including detection and identification of a streaming service type, stream-based traffic control, stream-based packet statistics, and so on, through a network operation device (for example, a router, a switch or a service gateway).

In the prior art, a process for the network operation device to control and manage the streaming service is briefly described as follows:

A load sharing module receives a service stream, obtains an allocation identifier of the service stream by using the 5-tuple of a packet-based hash (HASH) algorithm. The load sharing module then forwards, according to allocation ranges of currently valid service nodes, the service stream to a service node corresponding to an allocation range to which the allocation identifier belongs.

The allocation ranges of the currently valid service nodes are ranges obtained by averagely sharing a full set of the allocation identifiers among the currently valid service nodes, where the same number of service streams is allocated to each valid service node.

The service node processes a packet of the service stream and establishes a stream table to instruct forwarding. The capacity of the stream table is large (for example, 20 M to 60 M items), and stream tables between service nodes are backups of each other.

When a service node fails, the number of currently valid nodes is changed, and thereby the allocation ranges of the currently valid nodes are changed accordingly. That is to say, the allocation ranges of the currently valid nodes are ranges obtained by sharing the full set of allocation identifiers again according to the changed number of the currently valid nodes, so a range of streams to be processed by the service nodes is also changed, and a corresponding stream table item or a backup stream table item needs to be established or deleted, which is a process of smoothing a stream table item. In the smoothing process, in order to keep the service uninterrupted, according to a processing range of the currently valid service nodes, an originally existing part of stream table items are migrated to other service boards through the smoothing process for processing. After the smoothing process ends, the load sharing module performs traffic load sharing again according to the number of currently valid service nodes after the failure occurs.

During research and practice of the prior art, the inventor of the present invention finds that, when a service node fails, the number of currently valid service nodes is changed, and thereby the allocation ranges of the currently valid service node are changed accordingly. That is to say, the allocation ranges of the currently valid service node are ranges obtained by averagely sharing the full set of allocation identifiers again according to the changed number of the currently valid nodes, so the range of streams to be processed by the service nodes is also changed. Therefore, in the smoothing process, according to the processing range of the currently valid service nodes, a large number of originally existing stream table items are migrated to other service boards through the smoothing process for processing. These stream table items include not only a backup stream table item of the failed service node but also a part of stream table items of the currently valid service nodes. Since the number of stream table items to be smoothed is large, a large bandwidth is required between service nodes to enable the stream table items to be smoothed to be migrated to other service nodes. Moreover, since the number of the stream table items to be smoothed is large, a long processing time is required, and a large amount of resources are occupied.

SUMMARY

Embodiments of the present invention provide a streaming service load sharing method, a streaming service processing method, and a corresponding device and system, which are capable of reducing the number of stream table items that need to be moved during smoothing of stream table items.

In one aspect, an embodiment of the present invention provides a streaming service load sharing method, including: receiving a service stream; calculating an allocation identifier of the service stream; determining, according to allocation ranges of currently valid service nodes, a service node corresponding to an allocation range to which the allocation identifier of the service stream belongs, where the service node belongs to the currently valid service nodes, and an allocation range of a currently valid service node includes its own fixed allocation range and a part of fixed allocation ranges of service nodes that are currently in an invalid state, where the part is shared by the currently valid service node; and judging whether the service node fails; if no, forwarding the service stream to the service node; if yes, forwarding the service stream to a backup service node of the service node, receiving a message that is sent by a management module and indicates that the service node is invalid, and increasing the number of currently invalid service nodes by 1 to adjust the allocation ranges of the currently valid service nodes again.

In another aspect, an embodiment of the present invention provides a streaming service processing method, including: receiving a message that is sent by a management module and indicates that a service node fails; traversing backup stream table items of the service node; and determining, according to processing ranges of currently normal service nodes, a part of the backup stream table items that needs to be smoothed to other normal service nodes, where a processing range of a currently normal service node includes its own fixed allocation range and a part of fixed allocation ranges of service nodes that are currently in an invalid or failed state, where the part is shared by the currently normal service node; and after completing the smoothing of stream table items, sending a message indicating that a smoothing process ends to the management module.

In another aspect, an embodiment of the present invention provides a streaming service processing system, including: a management module, configured to monitor a state of each service node, send a message indicating that a service node fails to normal service nodes, and after receiving messages that are sent by all the normal service nodes and indicate that smoothing processes end, send a message indicating that the service node is invalid to a load sharing module; a service node, configured to, after receiving the message that is sent by the management module and indicates that the service node fails, traverse backup stream table items of the service node; determine, according to processing ranges of currently normal service nodes, a part of the backup stream table items that needs to be smoothed to other normal service nodes, where a processing range of a currently normal service node includes its own fixed allocation range and a part of fixed allocation ranges of service nodes that are currently in an invalid or failed state, where the part is shared by the currently normal service node; and after completing the smoothing of stream table items, send a message indicating that the smoothing process ends to the management module; and the load sharing module, configured to receive a service stream, calculate an allocation identifier of the service stream, determine, according to allocation ranges of currently valid service nodes, the service node corresponding to an allocation range to which the allocation identifier of the service stream belongs, where the service node belongs to the currently valid service nodes, and an allocation range of a currently valid service node includes its own fixed allocation range and a part of fixed allocation ranges of service nodes that are currently in an invalid state, where the part is shared by the currently valid service node; judge whether the service node fails; if no, forward the service stream to the service node; and if yes, forward the service stream to a backup service node of the service node; receive the message that is sent by the management module and indicates that the service node is invalid; and increase the number of currently invalid service nodes by 1 to adjust the allocation ranges of the currently valid service nodes again.

In another aspect, an embodiment of the present invention provides a streaming service processing device, including: a first receiving unit, configured to receive a message that is sent by a management module and indicates that a service node fails; a smoothing process processing unit, configured to, after the message indicating that the service node fails is received, traverse backup stream table items of the service node; and determine, according to processing ranges of currently normal service nodes, a part of the backup stream table items that needs to be smoothed to other normal service nodes, where a processing range of a currently normal service node includes its own fixed allocation range and a part of fixed allocation ranges of service nodes that are currently in an invalid or failed state, where the part is shared by the currently normal service node; and a first sending unit, configured to, after completing the smoothing of stream table items, send a message indicating that a smoothing process ends to the management module.

In another aspect, an embodiment of the present invention provides a streaming service load sharing device, including: a third receiving unit, configured to receive a service stream; an allocation identifier, configured to calculate an allocation identifier of the service stream; a load sharing unit, configured to determine, according to allocation ranges of currently valid service nodes, a service node corresponding to an allocation range to which the allocation identifier of the service stream belongs, where the service node belongs to the currently valid service node, and an allocation range of a currently valid service node includes its own fixed allocation range and a part of fixed allocation ranges of service nodes that are currently in an invalid state, where the part is shared by the currently valid service node; a forwarding unit, configured to judge whether the service node fails; if no, forward the service stream to the service node; and if yes, forward the service stream to a backup service node of the service node; and a fourth receiving unit, configured to receive a message that is sent by a management module and indicates that the service node is invalid, trigger the load sharing unit to increase the number of currently invalid service nodes by 1 to adjust the allocation ranges of the currently valid service nodes again.

In this embodiment, a processing range of a normal service node includes its own fixed allocation range and a part of fixed allocation ranges of service nodes that are currently in an invalid or failed state, where the part is shared by the normal service node. When the service node fails, the backup node of the service node determines, according to the processing ranges of the currently normal service nodes, a part of the stream table items that needs to be smoothed to other normal service nodes, that is, the number of stream table items that need to be moved between the currently normal service nodes in the smoothing process is only the number of stream table items that correspond to the processing ranges of nodes in the failed state. In this way, in comparison with the prior art, the number of stream table items that need to be moved between service nodes in the smoothing process is able to be reduced, system resources occupied in the smoothing process are able to be saved, a requirement for the bandwidth between the service nodes is decreased, and efficiency of completing the smoothing process is improved.

DETAILED DESCRIPTION

Embodiments of the present invention provide a streaming service load sharing method, a streaming service processing method, a device, and a system, for reducing the number of stream tables that need to be moved between service nodes in a smoothing process.

Figure 1:
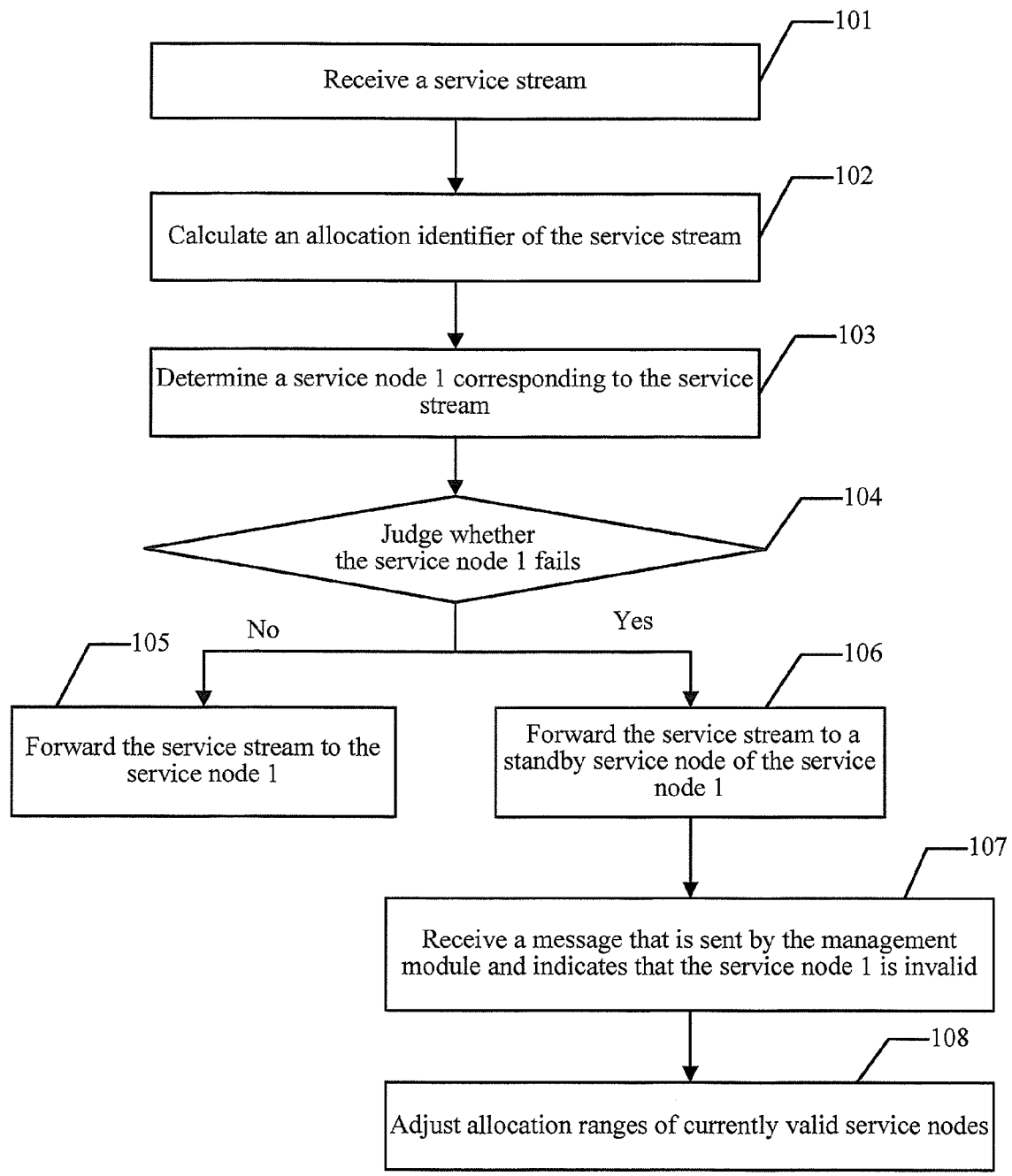
FIG. 1 is a schematic diagram of an embodiment of a streaming service load sharing method according to an embodiment of the present invention.

Referring to FIG. 1, a streaming service load sharing method in an embodiment of the present invention includes the following steps:

101: Receive a service stream.

The service stream received by a load sharing module may be a service stream based on the 5-tuple of a packet (a source IP+a source port+a destination IP+a destination port+a protocol number).

102: Calculate an allocation identifier of the service stream.

The load sharing module determines the allocation identifier of the service stream according to a load sharing algorithm. Herein, the allocation identifier corresponds to the service stream. All possible allocation identifiers form a limited set. Herein, this set is called a full set of allocation identifiers. For packets of the same service stream, the same allocation identifier is obtained through calculation. The same identifier may be obtained for multiple service streams. These service streams with the same identifier are shared by the same service node. In this embodiment, the load sharing algorithm is not limited. For example, a hash (HASH) algorithm based on the 5-tuple of the packet may be used, and a size of a HASH bucket is the number of all possible allocation identifiers.

103: Determine a service node 1 corresponding to the service stream.

The load sharing module determines, according to allocation ranges of currently valid service nodes, the service node 1 corresponding to an allocation range to which the allocation identifier of the current service stream belongs, where the "service node 1" is one of the currently valid service nodes. Herein, for the purpose of brief description, the service node corresponding to the allocation identifier of the service stream is called the "service node 1", and a name, for example, a service node 2, which is used subsequently is also for the convenience of description, instead of representing any limitations on the order or identifiers of the service nodes.

An allocation range of a currently valid service node includes its own fixed allocation range and a range that is obtained by sharing fixed allocation ranges of service nodes currently in an invalid state by the currently valid service node.

For example, it is assumed that four service nodes A, B, C, and D exist in total. A union set of fixed allocation ranges of the four service nodes is a full set of allocation identifiers. If the service node A is in an invalid state and the service nodes B, C, and D are in a valid state, an allocation range of the service node B includes a fixed allocation range of the service node B and a part of a fixed allocation range of the service node A, where the part is shared by the service node B. Similarly, an allocation range of the service node C includes a fixed allocation range of the service node B and a part of the fixed allocation range of the service node A, where the part is shared by the service node C.

The service node in this embodiment may be specifically a service board in a service processing system or a server or a data center in a new generation data center that uses a cloud computing technology.

104: Judge whether the service node 1 fails; if no, perform step 105; if yes, perform step 106.

After determining, according to the allocation ranges of the currently valid service nodes, the service node 1 corresponding to the allocation range to which the allocation identifier belongs, the load sharing module forwards the service stream according to a current state of the service node 1. The load sharing module may learn a state of each service node by receiving a message that is sent by a management module and indicates the state of each service node. For example, the load sharing module can update the state of the service node 1 by receiving a message that is sent by the management module and indicates that the service node 1 fails. Definitely, the management module for detecting the state of each service node and the load sharing module may also be integrally disposed on the same device.

Herein, a failure of the service node includes a state that, for example, a service node running normally is damaged or the use of a service node is stopped, which leads to abnormal running. For example, the service board in the service processing system is unplugged or runs abnormally, or the server or the data center in the new generation data center that uses the cloud computing technology runs abnormally, or is canceled, or is disconnected.

105: Forward the service stream to the service node 1.

106: Forward the service stream to a backup service node of the service node 1.

107: Receive a message that is sent by the management module and indicates that the service node 1 is invalid.

After the service node 1 fails, the management module triggers smoothing of stream table items between the service nodes. After receiving a message indicating that the smoothing processes of all the service nodes end, the management module sends the message indicating that the service node 1 is invalid to the load sharing module.

108: Adjust the allocation ranges of the currently valid service nodes.

After receiving the message that is sent by the management module and indicates that the service node 1 is invalid, the load sharing node increases the number of currently invalid service nodes by 1 to adjust the allocation ranges of the currently valid service nodes again. That is to say, an allocation range of a currently valid service node includes its own fixed allocation range and an allocation range that is obtained after the load sharing device makes the currently valid service node share the fixed allocation ranges of the currently invalid service nodes including the service node 1.

For example, it is assumed that in the example of four service nodes A, B, C, and D, originally, the service node A is in the invalid state whereas the service nodes B, C, and D are in the valid state, and then the service node B fails. After the service nodes C and D complete smoothing, the management module informs the load sharing module that the service node B is invalid. In this case, the allocation range of C is adjusted again to include the fixed allocation range of C+a part of the fixed allocation range of A, where the part is shared by C+a part of the fixed allocation range of B, where the part is shared by C. Similarly, the allocation range of D is adjusted to include a fixed allocation range of D+a part of the fixed allocation range of A, where the part is shared by D+a part of the fixed allocation range of B, where the part is shared by D. It should be noted that, the part of the fixed allocation range of A in the case that only A is invalid may be different from that in the case that both A and B are invalid, where the part is shared by C. That is because in the case that only A is invalid, the fixed allocation range of A is shared by three valid nodes (B, C, and D); while in the case that both A and B are invalid, the fixed allocation range of A is shared by only two valid nodes (C, D).

In this embodiment, the load sharing device uses the load sharing method to forward the streaming service without establishing a stream table item, thereby saving resources of the load sharing node. Moreover, based on the manner of determining an allocation range of a used service node, the number of stream table items smoothed between other service nodes when a certain node fails is able to be effectively reduced.

Figure 2:
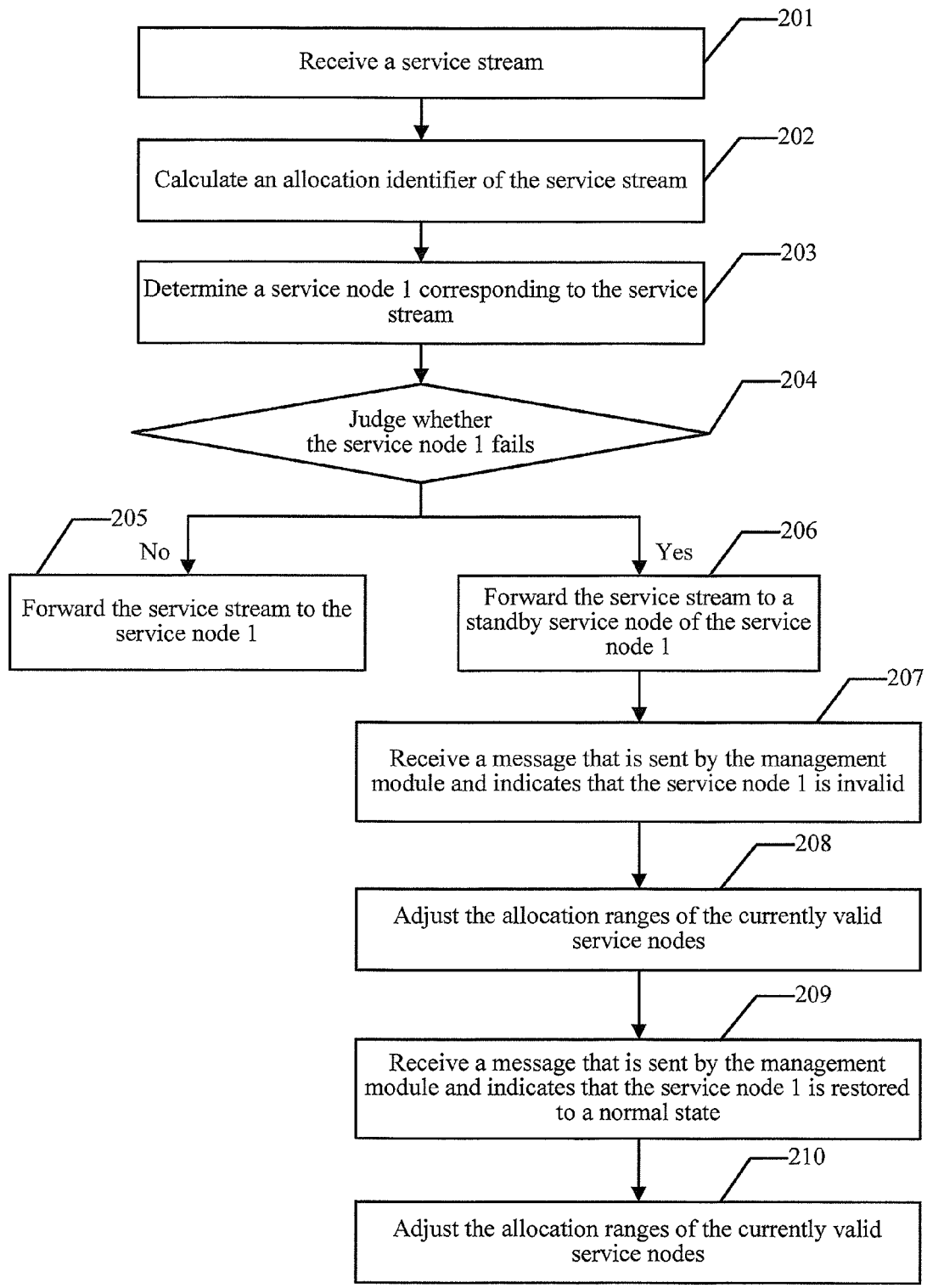
FIG. 2 is a schematic diagram of another embodiment of a streaming service load sharing method according to an embodiment of the present invention.

Referring to FIG. 2, a load sharing method in another embodiment of the present invention includes the following steps:

201: Receive a service stream.

202: Calculate an allocation identifier of the service stream.

Steps 201-202 may be performed by referring to steps 101-102 and are not described here again.

203: Determine a service node 1 corresponding to the service stream.

Similar to step 103, in this embodiment, a load sharing module determines, according to allocation ranges of currently valid service nodes, the service node 1 corresponding to an allocation range to which the allocation identifier of the current service stream belongs. An allocation range of a currently valid service node includes its own fixed allocation range and a range that is obtained by sharing fixed allocation ranges of service nodes currently in an invalid state by the currently valid service node.

In this embodiment, a fixed allocation range is a range obtained by averagely allocating a full set of allocation identifiers to N service nodes, where N is the maximum number of service nodes. For example, for a streaming service processing system using a service board, the maximum number of configurable slots (that is, the maximum number of service boards capable of being connected) is the maximum number of service nodes, and for a configured system, N is generally fixed.

Moreover, the sharing the fixed allocation ranges of the service nodes currently in the invalid state by the currently valid service node specifically includes performing the following operations on each service node currently in the invalid state: averagely dividing a fixed allocation range of a service node currently in the invalid state into M1 parts, where each part is shared by 1 currently valid service node, that is, M1 is equal to the number of currently valid service nodes. As stated previously, N is the maximum number of service nodes, so M1=N−K, where K is the number of currently invalid service nodes.

It should be noted that, the fixed allocation range may also be determined in another manner. For example, the full set of allocation identifiers is allocated to N service nodes according to a certain proportion. Similarly, the fixed allocation range of the service node currently in the invalid state may also be divided into M1 parts according to the same proportion, where each part is shared by one currently valid service node.

204-208 are the same as steps 104-108 in the embodiment shown in FIG. 1 and are not described here again.

209: Receive a message that is sent by a management module and indicates that the service node 1 is restored to the valid state.

After the management module detects that the service node 1 is restored to normal running (for example, a damaged service node is repaired or a service node is inserted or connected on an originally vacant position), smoothing of stream table items between the service nodes may also be triggered. After receiving a message indicating that smoothing processes of all the service nodes end, the management module sends the message indicating that the service node 1 is restored to the valid state to the load sharing module.

210: Adjust the allocation ranges of the currently valid service nodes.

After receiving the message that is sent by the management module and indicates that the service node 1 is restored to the valid state, the load sharing module subtracts 1 from the number of currently invalid service nodes to adjust the allocation ranges of the currently valid service nodes again. For a configured system, N is generally fixed, so the fixed allocation ranges in the allocation ranges of the currently valid service nodes are unchanged. The load sharing device again makes the currently valid service nodes (including the service node 1) share fixed allocation ranges of the currently invalid service nodes (no longer including the service node 1).

In this embodiment, an allocation range of a currently valid service node includes its own fixed allocation range and a range that is obtained by sharing fixed allocation ranges of service nodes currently in an invalid state by the service node. The fixed allocation ranges are ranges obtained by averagely allocating the full set of allocation identifiers to N service nodes, where N is the maximum number of service nodes. The sharing the fixed allocation ranges of the service nodes currently in the invalid state by the currently valid service node specifically includes performing the following operations on each service node currently in the invalid state: averagely dividing a fixed allocation range of a service node currently in the invalid state into M1 parts, where each part is shared by one currently valid service node. M1=N−K, where K is the number of currently invalid service nodes. By adopting the foregoing method, the allocation ranges of the currently valid service nodes are able to be quickly determined, thereby further improving efficiency of completing load sharing.

Figure 3:
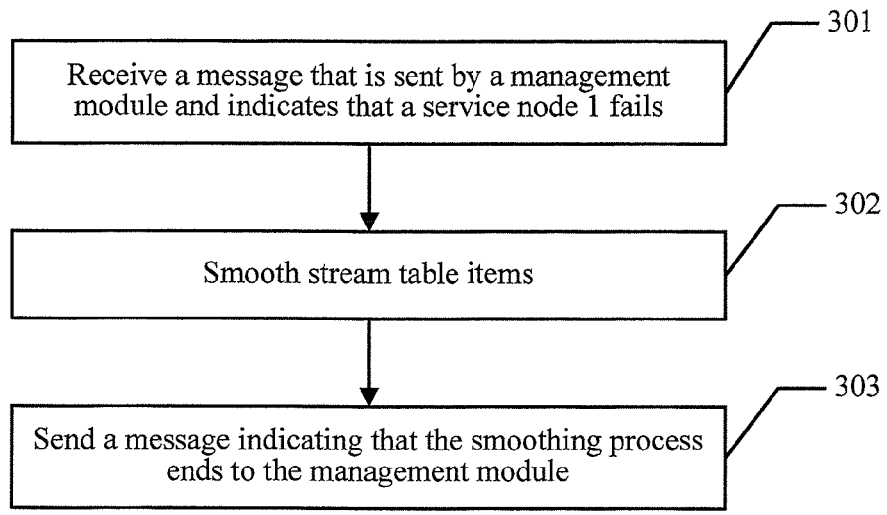
FIG. 3 is a schematic diagram of an embodiment of a streaming service processing method according to an embodiment of the present invention.

In the foregoing, the streaming service load sharing method in the embodiment of the present invention is described in detail. In the following, a streaming service processing method in an embodiment of the present invention is described. Referring to FIG. 3, the streaming service processing method in this embodiment of the present invention includes the following steps:

301: Receive a message that is sent by a management module and indicates that a service node 1 fails.

In this embodiment, when detecting that the service node 1 fails, the management module may send the message indicating that the service node 1 fails to currently normal service nodes.

302: Smooth stream table items.

After receiving the message indicating that the service node 1 fails, the currently normal service nodes adjust processing ranges to perform smoothing of the stream table items. For example, after receiving the message that is sent by the management module and indicates that the service node 1 fails, a backup service node of the service node 1 traverses backup stream table items of the service node 1, and determines, according to processing ranges of currently normal service nodes (not including the service node 1), a part of the backup stream table items that needs to be smoothed to other normal service nodes. A processing range of a normal service node includes its own fixed allocation range and a range that is obtained by sharing fixed allocation ranges of service nodes currently in an invalid or failed state by the service node.

In this embodiment, a fixed allocation range may be a range obtained by averagely allocating a full set of allocation identifiers to N service nodes, where N is the maximum number of service nodes. Definitely, the full set of allocation identifiers may also be allocated to the N service nodes according to a certain proportion to determine the fixed allocation range of each service node.

Moreover, the sharing the fixed allocation ranges of the service nodes currently in the invalid or failed state by the currently normal service node specifically includes performing the following operations on each service node currently in the invalid or failed state: averagely dividing a fixed allocation range of a service node currently in the invalid or failed state into M2 parts, where each part is shared by one currently normal service node (not including the service node 1 in this case), M2=N−H, H is the number of currently invalid and failed service nodes, that is, if the number of currently invalid service nodes is H1 and the number of failed service nodes is H2, H=H1+H2. Similarly, a fixed allocation range of a service node D may also be divided into M2 parts according to a certain proportion, where each part is shared by one currently normal service node.

The backup node of the service node 1 performs smoothing of the stream table items according to adjusted processing ranges of the currently normal service nodes. Definitely, other normal service nodes also perform the similar processes of smoothing stream table items. For example, the stream table items smoothed by the backup service node of the service node 1 are received, active stream table items are established according to the smoothed stream table items, and then corresponding backup stream table items are established on corresponding backup nodes according to respective backup relationships.

303: Send a message indicating that the smoothing process ends to the management module.

After completing the smoothing of stream table items, the backup service node of the service node 1 sends the message indicating that the smoothing process ends to the management module. Definitely, after completing the smoothing of stream table items, other normal service nodes may also send messages indicating that the smoothing processes end to the management module. After receiving the messages that smoothing is completed from all the normal nodes, the management module informs the load sharing device that the service node 1 is invalid, and the load sharing device may regard the service node 1 as an invalid node and adjust the allocation ranges of the currently valid service nodes.

It can be seen from this that, before the smoothing process of stream table items is completed, the "number K of currently invalid service nodes" that is used for the load sharing device to determine the allocation ranges does not include the service node 1, and the "number H of currently invalid and failed service nodes" that is used to determine the processing ranges on the normal service nodes includes the service node 1, that is, H=K+1. Definitely, after the smoothing of stream table items is completed, the processing ranges on the service nodes are consistent with the allocation ranges on the load sharing device. In this embodiment, a processing range of a normal service node includes its own fixed allocation range and a range that is obtained by sharing fixed allocation ranges of service nodes currently in the invalid or failed state by the service node. When the service node 1 fails, the backup node of the service node 1 traverses the backup stream table items of the service node 1, and determines, according to the processing ranges of the currently normal service nodes, a part of the backup stream table items that needs to be smoothed to another normal service node, that is, the number of stream table items that need to be moved between the currently normal service nodes in the smoothing process is only the number of the backup stream table items. In this way, in comparison with the prior art, the number of stream table items that need to be moved between service nodes in the smoothing process is reduced, a requirement for the bandwidth between the service nodes is decreased, system resources occupied in the smoothing process are able to be saved, and efficiency of completing the smoothing process is improved.

In the embodiment shown in FIG. 3, another subsequent process may also be included. The specific subsequent process includes the following:

After each normal service node (including the backup service node of the service node 1) receives a message that is sent by the management module and indicates that the service node 1 is restored to a normal state, each normal service node subtracts 1 from the number of currently invalid and failed service nodes to adjust the processing ranges of the currently normal service nodes again. For a configured system, N is generally fixed, so the fixed allocation ranges in the processing ranges of the currently normal service nodes are generally unchanged. Fixed allocation ranges of the currently invalid and failed service nodes (no longer including the service node 1) are shared by currently normal service nodes (including the service node 1). Then, the smoothing of stream table items is performed according to adjusted processing ranges. After completing the smoothing of the stream table items, each normal service node may further send a message indicating that the smoothing process ends to the management module.

That the service node 1 is restored to the normal state includes a case that the service node 1 is restored from a damaged state to the normal state and a case that the service node 1 is newly inserted or connected.

The specific subsequent process may also include the following:

After the load sharing module adjusts the allocation ranges of the currently valid service nodes again, the load sharing module may send a message indicating that the allocation ranges of the currently valid service nodes are already adjusted to the management module. After receiving a message that is sent by the management module and indicates that the allocation ranges on the load sharing module are already adjusted again, each valid service node may delete a part of the stream table items that do not correspond to its processing range. In an actual application, another manner may also be adopted. For example, these stream table items that do not correspond to its processing range may be deleted in a normal aging process.

Figure 4:
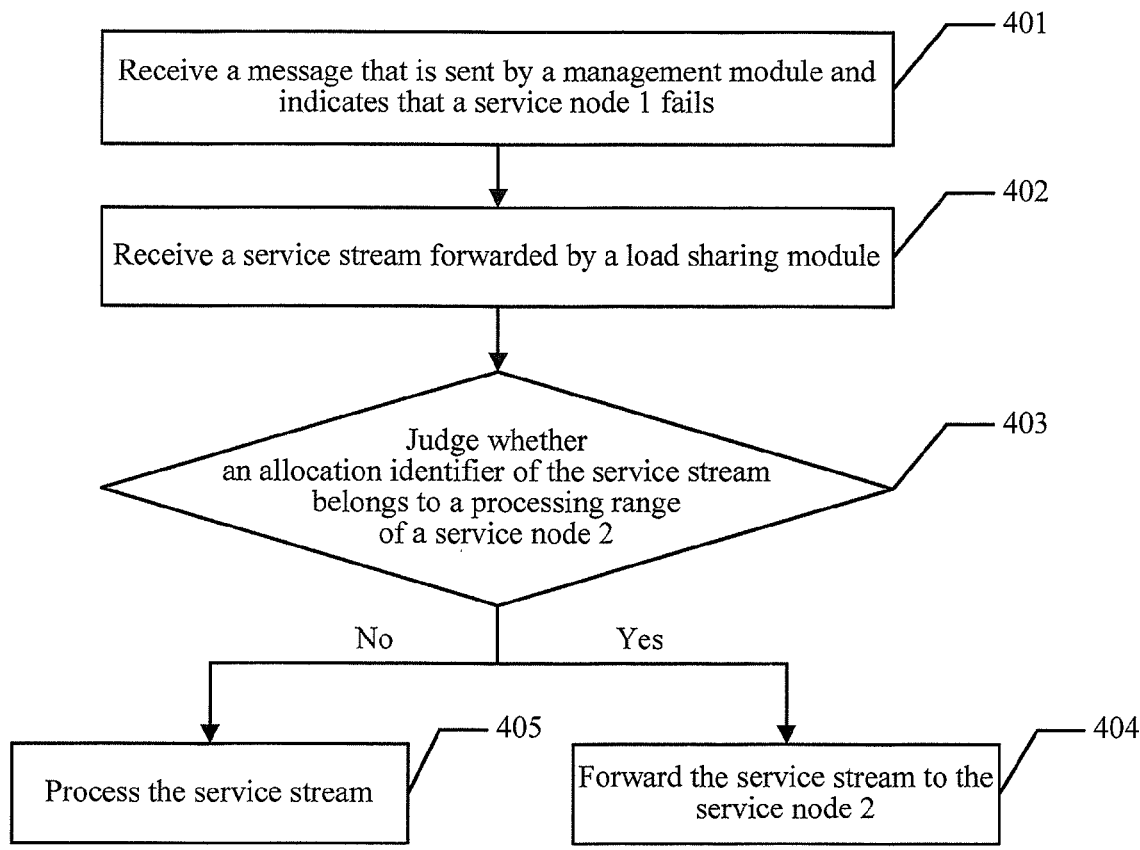
FIG. 4 is a schematic diagram of another embodiment of a streaming service processing method according to an embodiment of the present invention.

Referring to FIG. 4, a streaming service processing method in another embodiment of the present invention includes the following steps:

401: Receive a message that is sent by a management module and indicates that a service node 1 fails.

In this embodiment, when detecting that the service node 1 fails, the management module may send the message indicating that the service node 1 fails to other normal service nodes. As described in the embodiment corresponding to FIG. 3, after the management module sends the message indicating that the service node 1 fails, a smoothing process of stream table items between normal service nodes is triggered. For example, after receiving the message that is sent by the management module and indicates that the service node 1 fails, a backup service node of the service node 1 traverses backup stream table items of the service node 1, determines, according to processing ranges of currently normal service nodes (not including the service node 1), a part of the backup stream table items that needs to be smoothed to other normal service nodes, and performs the smoothing process of stream table items. With respect to the backup service node of the service node 1, a service stream processing manner in the smoothing process of stream table items is described in the following.

402: Receive a service stream forwarded by a load sharing module.

In the smoothing process of stream table items, the load sharing module receives a service stream and determines, according to allocation ranges of the currently valid service nodes (including the service node 1 in this case), a service node corresponding to an allocation range to which an allocation identifier of the service stream belongs. When the allocation identifier of the service stream belongs to an allocation range of the service node 1, since the service node 1 fails, the load sharing module may forward the service stream to the backup service node of the service node 1.

403: Judge whether the allocation identifier of the service stream belongs to a processing range of a service node 2; if yes, perform step 404; if no, perform step 405.

404: Forward the service stream to the service node 2.

405: Process the service stream.

In step 403, that the allocation identifier of the service stream belongs to the processing range of the service node 2 may include two cases: In one case, a stream table item needs to be created for the service stream, that is to say, the service stream is a new service stream, and no corresponding created stream table item exists; in the other case, a stream table item is already created for the service stream, but the stream table item needs to be smoothed to the service node 2.

Here, only a service stream for which a stream table item needs to be created may be forwarded to the service node 2, so that the service node 2 creates the stream table item and perform the service stream processing, thereby avoiding a resource waste caused by that the stream table item is created on the local node and then smoothed to the service node 2. A service stream with a created stream table item that still needs to be smoothed to the service node 2 may still be processed by the local node, thereby avoiding a delay of the service stream processing. It this case, the smoothing process of stream table items is also performed. After the smoothing process is completed, the load sharing device directly allocates a service stream with a processing range belonging to the service node 2 to the service node 2 for processing. Definitely, both types of service streams may be forwarded to the service node 2 for processing. In this case, for the service stream with the created stream table item, the service stream is forwarded to the service node 2, and meanwhile the corresponding stream table item is smoothed to the service node 2.

In this embodiment, when the backup service node of the service node 1 receives the service stream forwarded by the load sharing module, and judges, according to the processing ranges of the currently normal service nodes, that the allocation identifier of the service stream belongs to the processing range of the service node 2, the service stream is forwarded to the service node 2, thereby further saving occupied resources of the backup service node.

For convenience of understanding, the streaming service processing method and the streaming service load sharing method described in the foregoing embodiments are described in detail in a specific application scenario. It is assumed that:

the fixed number of slots configured in a streaming service processing system, that is, the maximum number N of service nodes is 4, stream tables between service nodes are backups of each other, that is, a service node 2 is a backup node of a service node 1, a service node 3 is a backup node of the service node 2, a service node 4 is a backup node of the service node 3, and the service node 1 is a backup node of the service node 4.

A process in which the streaming service processing system performs load sharing on a service stream by using a load sharing module and performs streaming service processing by using a service node is first described in a case that the service node 2 is in an invalid state and the service node 3 fails. The specific process is as follows:

The load sharing module receives a service stream. It is assumed that an allocation identifier of the service stream is calculated as "123" by using a HASH algorithm based on the 5-tuple of a packet (the number of HASH buckets is 200, that is, a full set of allocation identifiers is 1-200).

The load sharing module determines allocation ranges of currently valid service nodes according to a message that is sent by the management module and indicates that the service node 2 is in an invalid state.

In this example, an allocation range of each currently valid service node includes its own fixed allocation range and a range that is obtained by sharing fixed allocation ranges of service nodes currently in the invalid state by the service node. In this example, a fixed allocation range is a range obtained by averagely allocating the full set of allocation identifiers, that is, the number of HASH buckets set to 200, to four server nodes, and a fixed allocation range of the service node 2 in the invalid state is averagely divided into three parts according to the number of currently valid service nodes and shared by the currently valid service nodes. The obtained allocation ranges of the currently valid service nodes are as follows:

the service node 1: 1-50, and 51-67; the service node 3: 101-150, and 68-84; and the service node 4: 151-200, and 85-100.

In this example, the calculation process of determining the allocation ranges of the currently valid service nodes is performed by adopting a rounding down manner. Definitely, during actual implementation, another specific mathematical calculation manner may also be used, which is not limited in this example.

The load sharing module determines, according to the allocation ranges of the currently valid service nodes, a service node corresponding to an allocation range to which the allocation identifier of the service stream belongs, to know that a service node corresponding to the allocation range to which the allocation identifier "123" of the service stream belongs is the service node 3.

According to a message that is by the management module and indicates that the service node 3 fails, the load sharing module forwards the service stream to a backup service node of the service node 3, that is, the service node 4.

After detecting that the service node 3 fails, the management module sends the message indicating that the service node 3 fails to the load sharing module and sends the message to the currently normal service nodes at the same time.

After receiving the message, the backup service node 4 of the service node 3 determines, according to processing ranges of the currently normal service nodes, a part of backup stream table items of the service node 3, where the part needs to be smoothed to other normal service nodes. A processing range of each currently normal service node includes its own fixed allocation range and a range that is obtained by sharing fixed allocation ranges of service nodes currently in the invalid or failed state by the service node. In a configured system, the fixed allocation range of each service node is generally unchanged. In this embodiment, a fixed allocation range of the service node 3 in the failed state is averagely divided into two parts according to the number of currently normal service nodes and shared by the service node 1 and the service node 4. The obtained processing ranges of the currently normal service nodes are as follows:

the service node 1: 1-50, 51-75, and 101-125; and the service node 4: 151-200, 76-100, and 126-150.

The service node 4 traverses backup stream table items of the service node 3, and determines, according to the processing ranges of the currently normal service nodes, a part of the stream table items that needs to be smoothed to the service node 1 and the service node 4. After receiving a part of backup stream table items corresponding to their processing ranges, the service node 1 and the service node 4 establishes new active stream table items, and meanwhile the currently normal service nodes make backups for each other.

In the whole smoothing process of stream table items, the number of stream table items that need to be moved between service nodes is about 200, where the number of active stream table items that are newly established by the service node 1 is about 33, the number of active tables that are newly established by the service node 4 is about 33, and the number of backup stream table items that are newly established in the system is about 133.

After receiving a message that is sent by the service node 4 and indicates that the smoothing process ends, the management module sets the service node 3 to be in an invalid state, and sends a message indicating that the service node 3 is in the invalid state to the load sharing module. The load sharing module increases the number of currently invalid nodes by 1 to adjust the allocation ranges of the currently valid service nodes again. The obtained allocation ranges of the currently valid service nodes are as follows:

the service node 1: 1-50, 51-75, and 101-125; and the service node 4: 151-200, 76-100, and 126-150.

The following describes that a streaming service system performs streaming service processing and load sharing in a case that the service node 2 is restored to a normal state. The specific process is as follows:

After detecting that the service node 2 is restored to the normal state, the management module may send a message to currently normal service nodes, subtracts 1 from the number of currently invalid and failed service nodes to adjust processing ranges of the currently normal service nodes again. The obtained processing ranges of the currently normal service nodes, that is, the service nodes 1-4 are as follows:

the service node 1: 1-50; the service node 2: 51-100; the service node 3: 101-150; and the service node 4: 151-200.

According to the processing ranges of the currently normal service nodes 1 to 4, the service nodes 1 to 4 perform corresponding smoothing of stream table items. The service node 2 receives smoothed stream table items, establishes new active stream table items, and makes backups between service nodes. An unnecessary part included in the stream table items of the currently normal service nodes may be deleted in an aging process. After the smoothing of stream table items is completed, a message indicating that the smoothing process ends is sent to the management module.

In the whole smoothing process of stream table items, the number of stream table items that need to be moved between service nodes is 200, where the number of active stream table items newly established by the service node 2 is 50, the number of backup table items newly established is 100, and the number of unnecessary backup table items deleted is 50.

After receiving the message that is sent by a service node and indicates that the smoothing process ends, the management module sets the service node 2 to be valid, and sends a message indicating that the service node 2 is valid to the load sharing module. The load sharing module subtracts 1 from the number of currently invalid nodes to adjust the allocation ranges of the currently valid service nodes again. The obtained allocation ranges of the currently valid service nodes are as follows:

the service node 1: 1-50; the service node 2: 51-100; the service node 3: 101-150; and the service node 4: 151-200.

The streaming service processing method and the streaming service load sharing method described in the embodiments are described in detail in another specific application scenario. The scenario is specifically as follows:

the maximum number of slots that are able to be configured in a streaming service processing system, that is, the maximum number N of service nodes is 8, and stream tables between service nodes are backups of each other, that is, a service node 2 backs up for a service node 1, a service node 3 backs up for the service node 2, and so on.

That the streaming service processing system performs load sharing and streaming service processing through a load sharing module and a service node is first described in a case that service nodes 2, 3, and 6 are invalid and a service node 4 fails. The specific process is as follows:

The load sharing module receives a service stream. It is assumed that an allocation identifier of the service stream is calculated by using a 5-tuple based HASH algorithm, where the number of HASH buckets is set to 200.

The load sharing module determines allocation ranges of currently valid service nodes according to a message that is sent by a management module and indicates that the service nodes 2, 3, and 6 are in an invalid state. The obtained allocation ranges of the currently valid service nodes are as follows:

the service node 1: 1-25, 25-30, 51-55, and 126-130; the service node 4: 75-100, 31-35, 56-60, and 131-135; a service node 5: 101-125, 36-40, 61-65, and 136-140; a service node 7: 150-175, 41-45, 66-70, and 141-145; a service node 8: 175-200, 46-50, 71-75, and 146-150.

The load sharing module determines, according to the allocation ranges of the currently valid service nodes, a service node corresponding to an allocation range to which the allocation identifier of the service stream belongs, to know that the service node corresponding to the allocation range to which the allocation identifier of the service stream belongs is the service node 4.

According to a message that is sent by the management module and indicates that the service node 4 fails, the load sharing module forwards the service stream to a backup service node of the service node 4, that is, the service node 5.

After detecting that the service node 4 fails, the management module sends the message indicating that the service node 4 fails to the load sharing module and also sends the message to the currently normal service nodes at the same time.

After receiving the message, the backup service node 5 of the service node 4 traverses backup stream table items of the service node 4, increases the number of currently invalid and failed service nodes by 1 to obtain processing ranges of the currently normal service nodes, and determines, according to the processing ranges of the currently normal service nodes, a part of the backup stream table items of the service node 4, where the part needs to be smoothed to other normal service nodes. After receiving a part of backup stream table items that corresponds to their processing range, the currently normal service nodes may establish new active stream table items, and meanwhile the currently normal service nodes may further make backups for each other.

In the whole smoothing process of stream table items, the number of stream table items that need to be moved between service nodes is 90, where the number of active stream table items newly established is 25, and the number of backup stream table items newly established is 65.

After receiving a message that is sent by the service node 5 and indicates that the smoothing process ends, the management module sets the service node 4 to be in the invalid state, and sends a message indicating that the service node 4 is in the invalid state to the load sharing module. The load sharing module increases the number of currently invalid nodes by 1 to adjust the allocation ranges of the currently valid service nodes again.

That the streaming service system performs streaming service processing and load sharing in a case that the service node 2 is restored to a normal state is described in the following. The specific process is as follows:

After detecting that the service node 2 is restored to the normal state, the management module sends a message to currently normal service nodes, subtracts 1 from the number of currently invalid and failed service nodes to adjust processing ranges of the currently normal service nodes again.

According to the processing ranges of the currently normal service nodes, corresponding smoothing of stream table items is performed. The service node 2 receives smoothed stream table items, establishes new active stream table items, and makes backups between service nodes. An unnecessary part included in the stream table items of the currently normal service nodes is deleted in an aging process. After the smoothing of stream table items is completed, a message indicating that the smoothing process ends is sent to the management module.

In the whole smoothing process of stream table items, the number of stream table items that need to be moved between service nodes is 132, where the number of active stream table items newly established by the service node 2 is 33, the number of backup tables newly established is 66, and the number of backup stream table items deleted is 33.

After receiving a message indicating that the smoothing process ends sent by a service node, the management module sets the service node 2 to be valid, and meanwhile sends a message indicating that the service node 2 is valid to the load sharing module. The load sharing module subtracts 1 from the number of currently invalid nodes to adjust the allocation ranges of the currently valid service nodes again.

Figure 5:
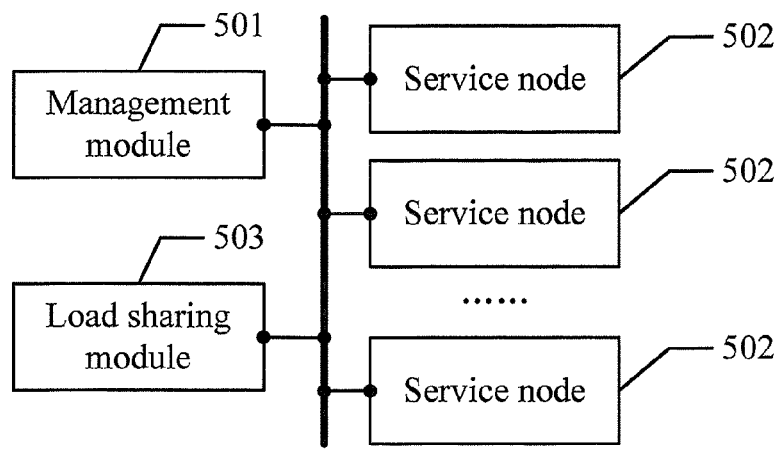
FIG. 5 is a schematic diagram of an embodiment of a streaming service processing system according to an embodiment of the present invention.

A streaming service processing system in an embodiment of the present invention is described in the following. Referring to FIG. 5, the streaming service processing system in this embodiment of the present invention includes:

a management module 501, configured to monitor a state of each service node, send a message indicating that a service node 1 fails to normal service nodes, and after receiving messages that are sent by all the normal service nodes and indicate that smoothing processes end, send a message indicating that the service node 1 is invalid to a load sharing module 503;

a service node 502, configured to, after receiving the message that is sent by the management module 501 and indicates that the service node 1 fails, traverse backup stream table items of the service node 1; determine, according to processing ranges of currently normal service nodes, a part of the backup stream table items that needs to be smoothed to other normal service nodes, where a processing range of a currently normal service node includes its own fixed allocation range and a range that is obtained by sharing fixed allocation ranges of service nodes currently in an invalid or failed state by the currently normal service node; and after completing the smoothing of stream table items, send a message indicating that the smoothing process ends to the management module; and the load sharing module 503, configured to receive a service stream, calculate an allocation identifier of the service stream, determine, according to allocation ranges of currently valid service nodes, the service node 1 corresponding to an allocation range to which the allocation identifier of the service stream belongs, where the service node 1 belongs to the currently valid service node, and an allocation range of a currently valid service node includes its own fixed allocation range and a range that is obtained by sharing fixed allocation ranges of service nodes currently in an invalid state by the currently valid service node; judge whether the service node 1 fails; if no, forward the service stream to the service node 1; if yes, forward the service stream to a backup service node of the service node 1; receive the message that is sent by the management module 501 and indicates that the service node 1 is invalid; and increase the number of currently invalid service nodes by 1 to adjust the allocation ranges of the currently valid service nodes again.

In order to process a case that the service node is restored, the streaming service processing system in this embodiment may further have the following features:

the management module 501 is further configured to send a message indicating that the service node 1 is restored to a normal state to the normal service nodes, and after receiving the messages that are sent by all the normal service nodes and indicate that the smoothing processes end, send a message indicating that the service node 1 is restored to the normal state to the load sharing module 503;

the service node 502 is further configured to receive the message that is sent by the management module 501 and indicates that the service node 1 is restored to the normal state, subtract 1 from the number of currently invalid and failed service nodes to adjust the processing ranges of the currently normal service nodes again; perform smoothing of stream table items accordingly; and after completing the smoothing of stream table items, send the message indicating that the smoothing process ends to the management module 501; and the load sharing module 503 is further configured to, after receiving the message that is sent by the management module 501 and indicates that the service node 1 is restored to the normal state, subtract 1 from the number of currently invalid service nodes to adjust the allocation ranges of the currently valid service nodes again.

Figure 6:
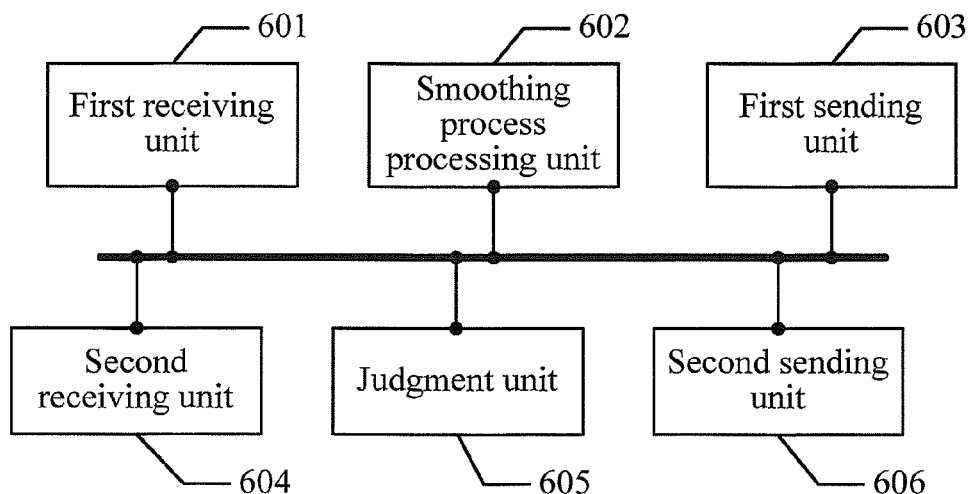
FIG. 6 is a schematic diagram of an embodiment of a streaming service load sharing device according to an embodiment of the present invention.

A streaming service processing device in an embodiment of the present invention is described in the following. The streaming service processing device serves as a service node. Referring to FIG. 6, the streaming service processing device in this embodiment of the present invention includes:

a first receiving unit 601, configured to receive a message that is sent by a management module and indicates that a service node 1 fails;

a smoothing process processing unit 602, configured to, after the first receiving unit 601 receives the message indicating that the service node 1 fails, traverse backup stream table items of the service node 1; and determine, according to processing ranges of currently normal service nodes, a part of the backup stream table items that needs to be smoothed to other normal service nodes, where a processing range of a currently normal service node includes its own fixed allocation range and a range that is obtained by sharing fixed allocation ranges of service nodes currently in an invalid or failed state by the currently normal service node; and a first sending unit 603, configured to, after the smoothing process processing unit 602 completes the smoothing of stream table items, send a message indicating that the smoothing process ends to the management module.

In order to process a case that the service node is restored, the streaming service processing device in this embodiment may further have the following features:

the first receiving unit 601 is further configured to receive a message that is sent by the management module and indicates that the service node 1 is restored to a normal state; and the smoothing process processing unit 602 is further configured to, after receiving the message that is sent by the first receiving unit 601 and indicates that the service node 1 is restored to the normal state, subtract 1 from the number of currently invalid and failed service nodes to adjust the processing ranges of the currently normal service nodes again; perform smoothing of stream table items accordingly; and after completing the smoothing of stream table items, trigger the first sending unit 603 to send the message indicating that the smoothing process ends to the management module.

In order to better process the service stream during the smoothing of stream table items, the streaming service processing device in this embodiment may further include:

a second receiving unit 604, configured to receive a service stream forwarded by the load sharing module;

a judgment unit 605, configured to judge whether an allocation identifier of the service stream belongs to a processing range of a service node 2, where the service node 2 is one of currently normal service nodes; and if yes, trigger a second sending unit 606; and the second sending unit 606, configured to forward the service stream to the service node 2.

Figure 7:
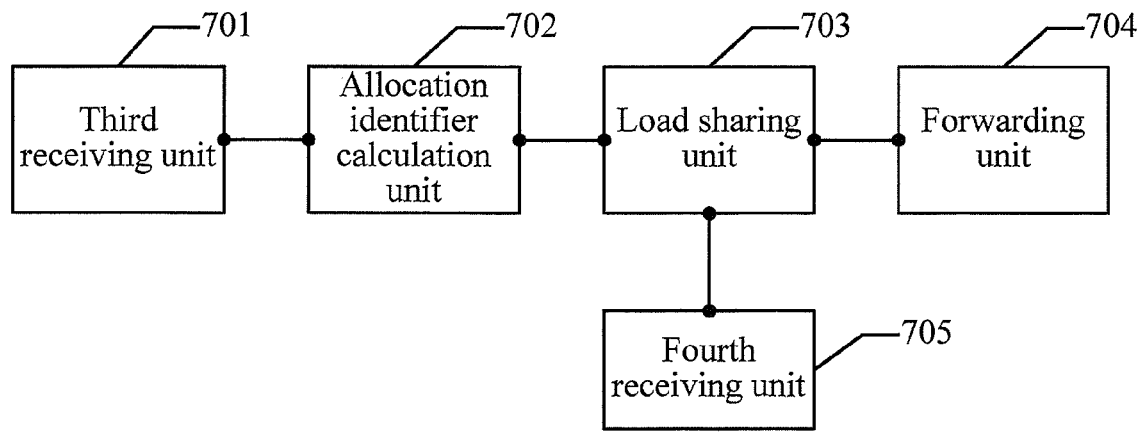
FIG. 7 is a schematic diagram of an embodiment of a streaming service processing device according to an embodiment of the present invention.

A streaming service load sharing device in an embodiment of the present invention is described in the following. Referring to FIG. 7, the streaming service load sharing device in this embodiment of the present invention includes:

a third receiving unit 701, configured to receive a service stream;

an allocation identifier calculation unit 702, configured to calculate an allocation identifier of the service stream that is received by the third receiving unit 701;

a load sharing unit 703, configured to determine, according to allocation ranges of currently valid service nodes, a service node 1 corresponding to an allocation range to which the allocation identifier of the service stream belongs, where the allocation identifier is calculated by the allocation identifier calculation unit 702, the service node 1 is one of currently valid service nodes, and an allocation range of a currently valid service node includes its own fixed allocation range and a range that is obtained by sharing fixed allocation ranges of service nodes currently in the invalid state by the currently valid service node;

a forwarding unit 704, configured to judge whether the service node 1 fails; if no, forward the service stream received by the third receiving unit 701 to the service node 1; and if yes, forward the service stream received by the third receiving unit 701 to a backup service node of the service node 1; and a fourth receiving unit 705, configured to receive a message that is sent by the management module and indicates that the service node 1 is invalid, and trigger the load sharing unit 703 to increase the number of currently invalid service nodes by 1 to adjust the allocation ranges of the currently valid service nodes again.

In order to process a case that the service node is restored, the streaming service load sharing device in this embodiment may further have the following features:

the fourth receiving unit 705 is further configured to receive a message that is sent by the management module and indicates that the service node 1 is restored to a normal state, and trigger the load sharing unit 703 to subtract 1 from the number of the currently invalid service nodes to adjust the allocation ranges of the currently valid service nodes again.

Persons of ordinary skill in the art should understand that all or a part of the steps of the methods according to the embodiments may be implemented by a program instructing relevant hardware. The program may be stored in a computer readable storage medium. The storage medium may be, for example, a read-only memory, a magnetic disk, or an optical disk.

The streaming service load sharing method, the streaming service processing method, and the device and the system provided by the present invention are introduced in detail in the foregoing. Persons of ordinary skill in the art can make variations to the present invention in terms of the specific implementations and application scopes according to the ideas of the embodiments of the present invention. To sum up, the specification shall not be construed as a limitation to the present invention.

What is claimed is:

1. A streaming service load sharing method, comprising:
receiving a service stream;
calculating an allocation identifier of the service stream;
determining a first service node according to the allocation identifier of the service stream, wherein the allocation identifier of the service stream belongs to an allocation range of the first service node, wherein the first service node is recorded as currently valid and the allocation range of the first service node comprises the first service node's own fixed allocation range and a part of a fixed allocation range of a second service node that is recorded as currently; and
determining whether the first service node fails;
in response to determining that the first service node does not fail, forwarding the service stream to the first service node; and
in response to determining that the first service node fails, forwarding the service stream to a backup service node of the first service node, recording the first service node as currently invalid, and allocating the allocation range of the first service node to the service node that is recorded as currently valid;
wherein
the first service node's own fixed allocation range is a range obtained by averagely allocating a full set of allocation identifiers to N service nodes; and
the fixed allocation range of the second service node is the range obtained by averagely allocating the full set of allocation identifiers to N service nodes, wherein N is the maximum number of service nodes.

2. A streaming service processing method, comprising:
traversing backup stream table items of a first service node that fails; and
determining, according to a processing range of a normal service node, a part of the backup stream table items that need to be smoothed to the normal service node, wherein the processing range of the normal service node comprises the normal service node's own fixed allocation range and a part of a fixed allocation range of a second service node that is recorded as currently invalid;
a fixed allocation range is a range obtained by averagely allocating a full set of allocation identifiers to N service nodes, wherein N is the maximum number of service nodes; and
the part of the fixed allocation range of the second service node is one of M2 parts, wherein the M2 parts are obtained by performing the following operation: averagely dividing a fixed allocation range of the second service node into the M2 parts, wherein M2=N−H, and H is the number of currently invalid service nodes.

3. The method according to claim 2, wherein the method further comprises:

receiving a service stream; and forwarding the service stream to a third service node when determining that an allocation identifier of the service stream belongs to a processing range of the third service node, wherein the third service node is valid.

4. The method according to claim 3, wherein:

the service stream with the allocation identifier belonging to the processing range of the third service node only comprises a service stream for which stream table items need to be created, or comprises a service stream for which stream table items need to be created and a service stream for which stream table items are already created but need to be smoothed to the third service node.

5. A streaming service processing device, comprising:

a processor; and a memory;

wherein the processor is configured to execute computer-executable instructions stored in the memory to perform operations of:

traversing backup stream table items of a first service node that is failed; and determining, according to a processing range of a normal service node, a part of the backup stream table items that need to be smoothed to the normal service node, wherein the processing range of the normal service node comprises the normal service node's own fixed allocation range and a part of a fixed allocation range of a second service node that is recorded as currently; and obtaining a fixed allocation range by averagely allocating a full set of allocation identifiers to N service nodes, wherein N is the maximum number of service nodes; wherein the part of the fixed allocation range of the second service node is one of M2 parts, wherein the M2 parts are obtained by performing the following operation: averagely dividing a fixed allocation range of the second service node into the M2 parts, wherein M2=N−H, and H is the number of currently invalid service nodes.

6. The device according to claim 5, wherein the processor is further configured to perform operations of:

receiving a service stream; and determining whether an allocation identifier of the service stream belongs to a processing range of a second service node; and if yes, forwarding the service stream to a third service node when determining that an allocation identifier of the service stream belongs to a processing range of the third service node, wherein the third service node is valid.

7. A streaming service load sharing device, comprising:

a processor; and a memory;

wherein the processor is configured to execute computer-executable instructions stored in the memory to perform operations of:

receiving a service stream;

calculating an allocation identifier of the service stream;

determining a first service node according to the allocation identifier of the service stream, wherein the allocation identifier of the service stream belongs to an allocation range of the first service node, wherein the first service node is recorded as currently valid, and the allocation range of the first service node comprises the first service node's own fixed allocation range and a part of a fixed allocation range of a second service node that is recorded as currently invalid;

determining whether the first service node fails;

in response to determining that the first service node does not fail, forwarding the service stream to the first service node;

in response to determining that the first service node fails, forwarding the service stream to a backup service node of the first service node;

recording the first service node as currently invalid; and allocating the allocation range of the first service node to the service node that is recorded as currently valid;

wherein the first service node's own fixed allocation range is a range obtained by averagely allocating a full set of allocation identifiers to N service nodes; and the fixed allocation range of the second service node is the range obtained by averagely allocating the full set of allocation identifiers to N service nodes, wherein N is the maximum number of service nodes.

* * * * *